US008165904B2

(12) United States Patent
Srinivasan et al.

(10) Patent No.: US 8,165,904 B2
(45) Date of Patent: Apr. 24, 2012

(54) ALLOCATING INVENTORY LEVELS

(75) Inventors: Mukundan Srinivasan, Union City, CA (US); Rongming Sun, Pleasanton, CA (US); Saurabh Thapliyal, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1174 days.

(21) Appl. No.: 11/248,921

(22) Filed: Oct. 11, 2005

(65) Prior Publication Data
US 2007/0083413 A1    Apr. 12, 2007

(51) Int. Cl.
*G06Q 10/00* (2006.01)
(52) U.S. Cl. .......................... 705/7.11; 705/7.25
(58) Field of Classification Search .............. 705/7.11, 705/7.25
See application file for complete search history.

(56) References Cited

U.S. PATENT DOCUMENTS

| 6,151,582 | A | * | 11/2000 | Huang et al. ............... 705/8 |
| 7,092,929 | B1 | * | 8/2006 | Dvorak et al. ............ 705/28 |
| 7,324,966 | B2 | * | 1/2008 | Scheer ..................... 705/28 |
| 2003/0216952 | A1 | * | 11/2003 | Klett et al. ................ 705/8 |
| 2004/0059649 | A1 | * | 3/2004 | Sakuma et al. ............ 705/28 |
| 2004/0230473 | A1 | * | 11/2004 | Dogan et al. ............. 705/10 |
| 2004/0230474 | A1 | * | 11/2004 | Dogan et al. ............. 705/10 |
| 2004/0230475 | A1 | * | 11/2004 | Dogan et al. ............. 705/10 |

OTHER PUBLICATIONS

Keaton, Mark, "Using the gamma distribution to model demand when lead time", Journal of Business Logistics: 1995.*

* cited by examiner

*Primary Examiner* — Mark Fleischer
(74) *Attorney, Agent, or Firm* — Kilpatrick Townsend & Stockton LLP

(57) ABSTRACT

Systems, methods, and machine-readable media are disclosed to allocating inventory across a plurality of locations in a supply chain. In one embodiment, a method comprises determining a total time-phased inventory and target safety stock level for each of the items at each location based on the baseline inventory as determined from expected demand and lead times for each item at each location, a target service level, a demand uncertainty level, a lead time uncertainty level, carrying costs in the supply chain and user constraints on budget, capacity and inventory.

22 Claims, 8 Drawing Sheets

ALLOCATING INVENTORY LEVELS

BACKGROUND

Embodiments of the present invention relate generally to inventory management and more particularly to allocation inventory levels throughout a supply chain.

In recent years, ever more attention has been paid to efficient allocation of items in supply management systems. Such systems, which can include warehouse management systems, supply chain management systems, inventory management systems, enterprise resource planning systems, and the like, all are dedicated to allowing organizations to more efficiently allocate scarce resources among competing purposes. Merely by way of example, modern warehouse management systems ("WMS") often are complex software packages that run on top of a relational database management system ("RDBMS"), such as the Oracle 10g RDBMS. Oracle Warehouse Management is one example of such a package.

Companies usually have limited funds to invest in inventory. Inventory planners often have to determine inventory levels in their supply chains subject to constraints on the budget that is available for deployment. Therefore, one goal of an inventory management application is to efficiently allocate items within these budget and/or other constraints. The challenge is to determine inventory levels that respect budget constraints, maximize expected profits, meet targeted customer service level requirements as far as the budget allows, model practical constraints such as contractual obligations to retailers involving limits on inventory levels, warehousing space constraints etc.

Existing solutions apportion the budget a priori among various item classes based on business objectives and historical data or rely on locally optimal heuristics involving prioritization of items and do not explicitly consider target service levels in arriving at the solution. Local optimization heuristics suffer from the drawback of not taking advantage of the supply chain structure to optimally deploy inventory throughout the chain to get high service levels at low costs.

Hence, there is a need in the art for more robust methods and systems for allocating items.

SUMMARY

Systems, methods, and machine-readable media are disclosed to allocating inventory across a plurality of locations in a supply chain. In one embodiment, a method is provided which comprises determining a baseline inventory for one or more items at each location in the supply chain based on expected values for demand for each of the one or more items and lead time for each location in the supply chain. A total time-phased inventory and target safety stock level can be determined for each of the one or more items at each location in the supply chain based on the baseline inventory, a target service level, a demand uncertainty level for each of the one or more items, a lead time uncertainty level for each location in the supply chain, and carrying costs in the supply chain. A constrained safety stock level can be established for each of the one or more items at each location in the supply chain based on user-defined inventory/budget/capacity constraints and the profitability of storing each item at each location in the supply chain. The production, procurement and transfer supplies to achieve these constrained safety stocks can then be determined and the final inventory can be tuned to respect user constraints.

According to one embodiment, determining a safety stock level for each of the one or more items at each location in the supply chain can be based on one or more user constraints. The constraints can include an inventory level for at least one of the one or more items at one or more locations in the supply chain and/or a maximum budget for total inventory. If the user constraints include a maximum budget for total inventory, determining a safety stock level for each of the one or more items at each location in the supply chain can comprise determining a safety stock level for each of the one or more items at each location in the supply chain that has a total inventory cost not greater than the maximum budget for total inventory.

According to another embodiment, tuning the safety stock level for each of the one or more items at each location in the supply chain can be based on one or more user constraints. The constraints can include an inventory level for at least one of the one or more items at one or more locations in the supply chain.

According to one embodiment, the method of allocating inventory across a plurality of locations in a supply chain further comprises allocating inventory across a plurality of locations in a supply for a user defined time period. The method may also include determining an overall actual service level achieved with the tuned safety stock level for each of the one or more items at each location in the supply chain and/or determining an overall inventory cost at the tuned safety stock level for each of the one or more items at each location in the supply chain.

According to yet another embodiment, a machine readable medium can have stored thereon a series of instructions which, when executed a processor, cause the processor to allocate inventory across a plurality of locations in a supply chain by determining a baseline inventory for one or more items at each location in the supply chain based on expected values for demand for each of the one or more items and lead time for each location in the supply chain. A total time-phased inventory and target safety stock level can be determined for each of the one or more items at each location in the supply chain based on the baseline inventory, a target service level, a demand uncertainty level for each of the one or more items, a lead time uncertainty level for each location in the supply chain, and carrying costs in the supply chain. A constrained safety stock level can be established for each of the one or more items at each location in the supply chain based on user-defined inventory, budget, capacity constraints, and/or the profitability of storing each item at each location in the supply chain. The production, procurement and transfer supplies to achieve these constrained safety stocks can then be determined and the final inventory can be tuned to respect user constraints.

According to still another embodiment, a system can comprise a processor and a memory coupled with and readable by the processor. The memory can contain a series of instruction that, when executed by the processor cause the processor to allocate inventory across a plurality of locations in a supply chain by determining a baseline inventory for one or more items at each location in the supply chain based on expected values for demand for each of the one or more items and lead time for each location in the supply chain. A total time-phased inventory and target safety stock level can be determined for each of the one or more items at each location in the supply chain based on the baseline inventory, a target service level, a demand uncertainty level for each of the one or more items, a lead time uncertainty level for each location in the supply chain and carrying costs in the supply chain. A constrained safety stock level can be established for each of the one or more items at each location in the supply chain based on user-defined inventory, budget, capacity constraints, and/or the profitability of storing each item at each location in the supply chain. The production, procurement and transfer supplies to achieve these constrained safety stocks can then be determined and the final inventory can be tuned to respect user constraints.

DETAILED DESCRIPTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Embodiments of the present invention include methods, systems, and media containing instructions for determining how to allocate inventory among various elements of a supply chain. As will be discussed in detail below, allocation of inventory can include consideration of a number of user defined constraints such as, but not limited to, a total budget for inventory, target service levels, and/or minimum inventory levels for specified items at specified locations. Allocation of inventory across a number of locations in a given supply chain can then be performed in a number of different modes that take these user constraints into consideration to find an efficient allocation within the user's specified constraints.

Figure 1:
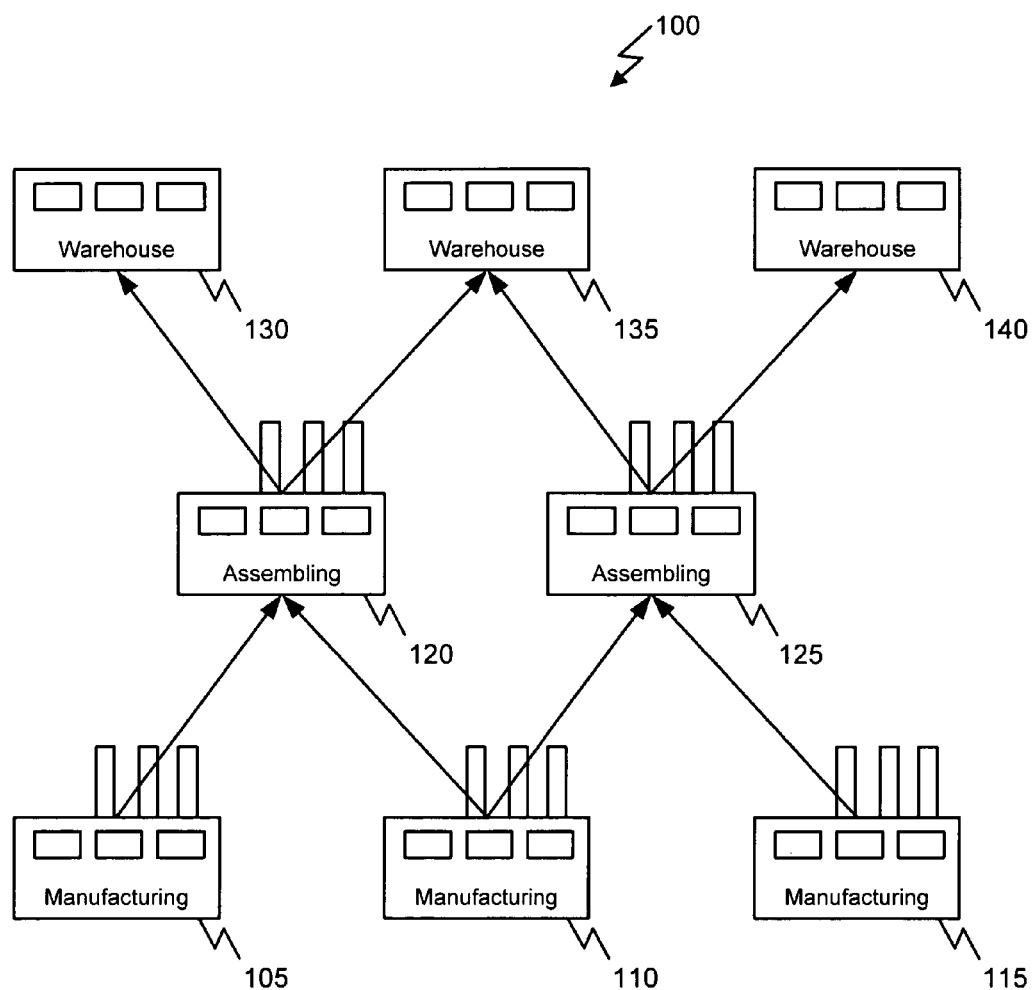
FIG. 1 is a block diagram illustrating an exemplary supply chain for which results of various embodiments of the present invention may be utilized to allocate inventory levels.

FIG. 1 illustrates an exemplary supply chain for which results of various embodiments of the present invention may be utilized to allocate inventory levels. In this example, the supply chain 100 includes manufacturing facilities 105-115, assembling facilities 120-125, and warehouses 130-140. Generally speaking, manufacturing facilities 105-115 may produce parts, components or subassemblies used by assembling facilities 120 and 125 to produce finished products to be stored in warehouses 130-140 until shipped to consumers, retailers, wholesalers, etc.

For example, manufacturing facilities 105 and 115 may produce CPUs and motherboards to be used in personal computers. Manufacturing facility 110 may produce disk drives also to be used in the assembled personal computers. The manufacturing facilities 105-115 can ship these parts, as required to meet demands, to assembling facilities 120 and 125 where they will be assembled, perhaps along with other parts, to complete finish product such as a desktop or laptop computer. Assembling facilities 120 and 125 may be, for example, located so as to supply specific markets. For example, assembling facility 120 may be located in the United States and supply warehouses 130 and 135 serving the United States, Canada, and Europe while assembling facility 125 may be located in Japan and supply warehouses 135 and 140 serving retailers in Europe and Asia. Therefore, assembling facilities may also add regional or market specific items such as cases, power supplies, user manuals, etc. Warehouse facilities 130-140 store the completed products for shipment to retailers, wholesalers, consumers, etc.

In other instances, the types, numbers, functions, locations, etc. of the various pieces of the supply chain 100 can vary widely. For example, the supply chain 100 may comprise only a single manufacturing facility and a single warehouse with both being located in the same structure or on the same site. In an other example at the opposite extreme, the supply chain may comprise multiple levels of facilities with each level comprising a large number of manufacturing facilities, assembling facilities, shipping facilities, warehouses, retail outlets, etc in diverse locations around the world. Regardless of the exact nature or configuration of the supply chain, embodiments of the present invention are considered to be equally useful in determining how to allocate inventories levels between the various facilities in a supply chain.

Typically each, or many of, the facilities in the supply chain can be used, to some extent, to store inventory. For example, manufacturing facility 105 can stored motherboards and CPUs while assembling facility 120 can store completed or partially completed personal computers. However, to determine how to allocate inventory among these facilities, several questions should be considered such as what items to be stored, where, and in what quantities. Furthermore, determining efficient answers to these question is complicated by the facts that not all items and storage locations are equally profitable, delivery times between facilities and by various facilities can vary, and demand for particular items can vary over different periods of time.

Embodiments of the present invention include methods for determining how to allocate inventory among various elements of a supply chain that may be implemented on a computer system operated in a number of different manners and environments. For example, software implementing methods of the present invention can be executed on a stand-alone computer system or in a network environment such as across the Internet, an intranet, or other communications network.

Figure 2:
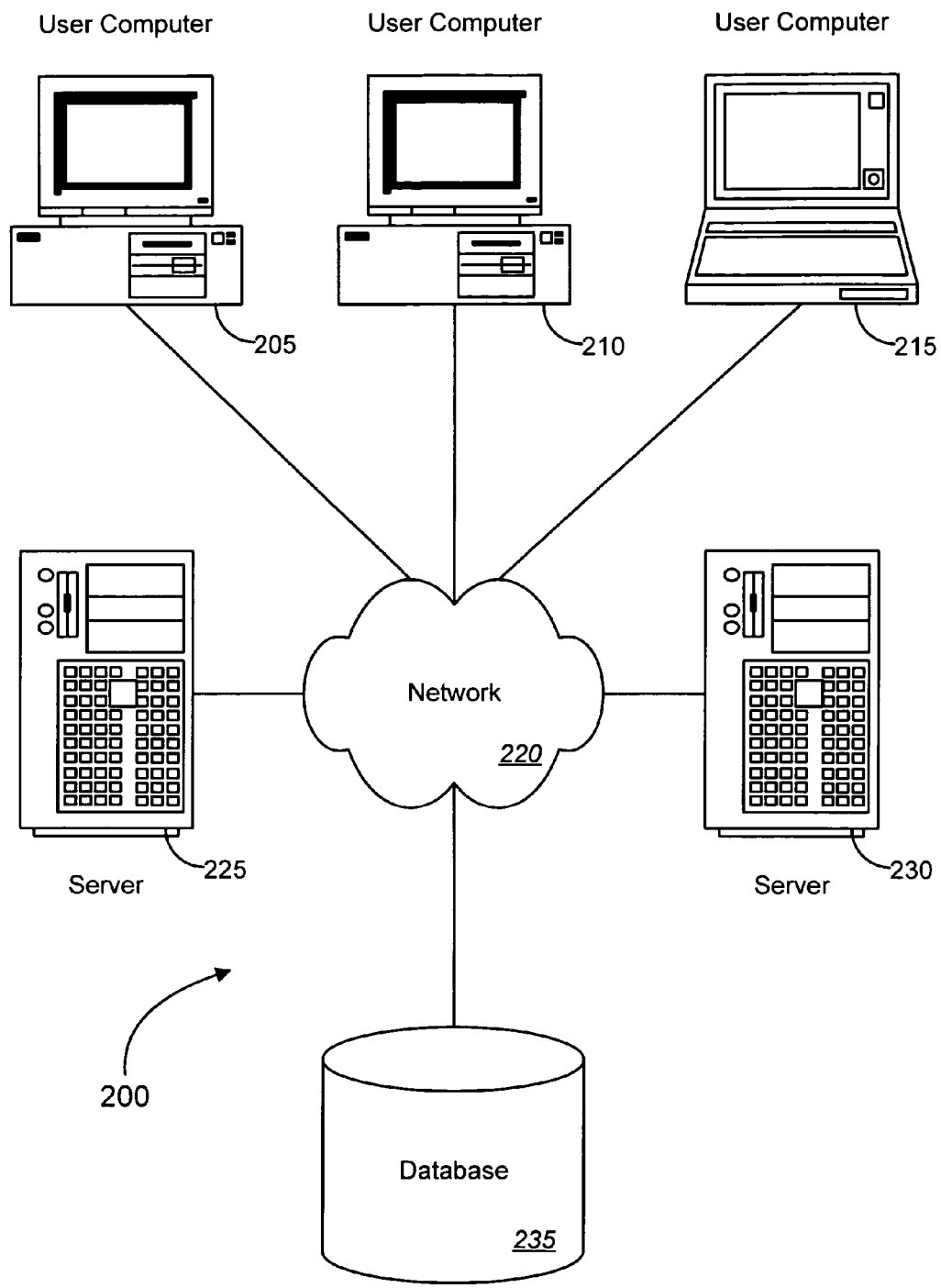
FIG. 2 is a block diagram illustrating components of an exemplary operating environment in which various embodiments of the present invention may be implemented.

FIG. 2 is a block diagram illustrating components of an exemplary operating environment in which various embodiments of the present invention may be implemented. The system 200 includes one or more user computers 205, 210, and 215. The user computers 205, 210, and 215 may be general purpose personal computers (including, merely by way of example, personal computers and/or laptop computers running various versions of Microsoft Corp.'s Windows and/ or Apple Corp.'s Macintosh operating systems) and/or workstation computers running any of a variety of commercially-available UNIX or UNIX-like operating systems. These user computers 205, 210, 215 may also have any of a variety of applications, including for example, database client and/or server applications, and web browser applications. Alternatively, the user computers 205, 210, and 215 may be any other electronic device, such as a thin-client computer, Internet-enabled mobile telephone, and/or personal digital assistant, capable of communicating via a network (e.g., the network 220 described below) and/or displaying and navigating web pages or other types of electronic documents. Although the exemplary system 800 is shown with three user computers, any number of user computers may be supported.

System 200 further includes a network 220. The network 220 may can be any type of network familiar to those skilled in the art that can support data communications using any of a variety of commercially-available protocols, including without limitation TCP/IP, SNA, IPX, AppleTalk, and the like. Merely by way of example, the network 220 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 225, 230. One server may be a web server 225, which may be used to process requests for web pages or other electronic documents from user computers 205, 210, and 220. The web server can be running an operating system including any of those discussed above, as well as any commercially-available server operating systems. The web server 225 can also run a variety of server applications, including HTTP servers, FTP servers, CGI servers, database servers, Java servers, and the like. In some instances, the web server 225 may publish operations available operations as one or more web services.

The system 200 may also include one ore more file and or/application servers 230, which can, in addition to an operating system, include one or more applications accessible by a client running on one or more of the user computers 205, 210, 215. The server(s) 230 may be one or more general purpose computers capable of executing programs or scripts in response to the user computers 205, 210 and 215. As one example, the server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The application server(s) 230 may also include database servers, including without limitation those commercially available from Oracle, Microsoft, Sybase™, IBM™ and the like, which can process requests from database clients running on a user computer 205.

In some embodiments, an application server 230 may create web pages dynamically for displaying the development system. The web pages created by the web application server 230 may be forwarded to a user computer 205 via a web server 225. Similarly, the web server 225 may be able to receive web page requests, web services invocations, and/or input data from a user computer 205 and can forward the web page requests and/or input data to the web application server 230.

In further embodiments, the server 230 may function as a file server. Although for ease of description, FIG. 2 illustrates a separate web server 225 and file/application server 230, those skilled in the art will recognize that the functions described with respect to servers 225, 230 may be performed by a single server and/or a plurality of specialized servers, depending on implementation-specific needs and parameters.

The system 200 may also include a database 235. The database 235 may reside in a variety of locations. By way of example, database 235 may reside on a storage medium local to (and/or resident in) one or more of the computers 205, 210, 215, 225, 230. Alternatively, it may be remote from any or all of the computers 205, 210, 215, 225, 230, and in communication (e.g., via the network 220) with one or more of these. In a particular set of embodiments, the database 235 may reside in a storage-area network ("SAN") familiar to those skilled in the art. Similarly, any necessary files for performing the functions attributed to the computers 205, 210, 215, 225, 230 may be stored locally on the respective computer and/or remotely, as appropriate. In one set of embodiments, the database 235 may be a relational database, such as Oracle 10i, that is adapted to store, update, and retrieve data in response to SQL-formatted commands.

Figure 3:
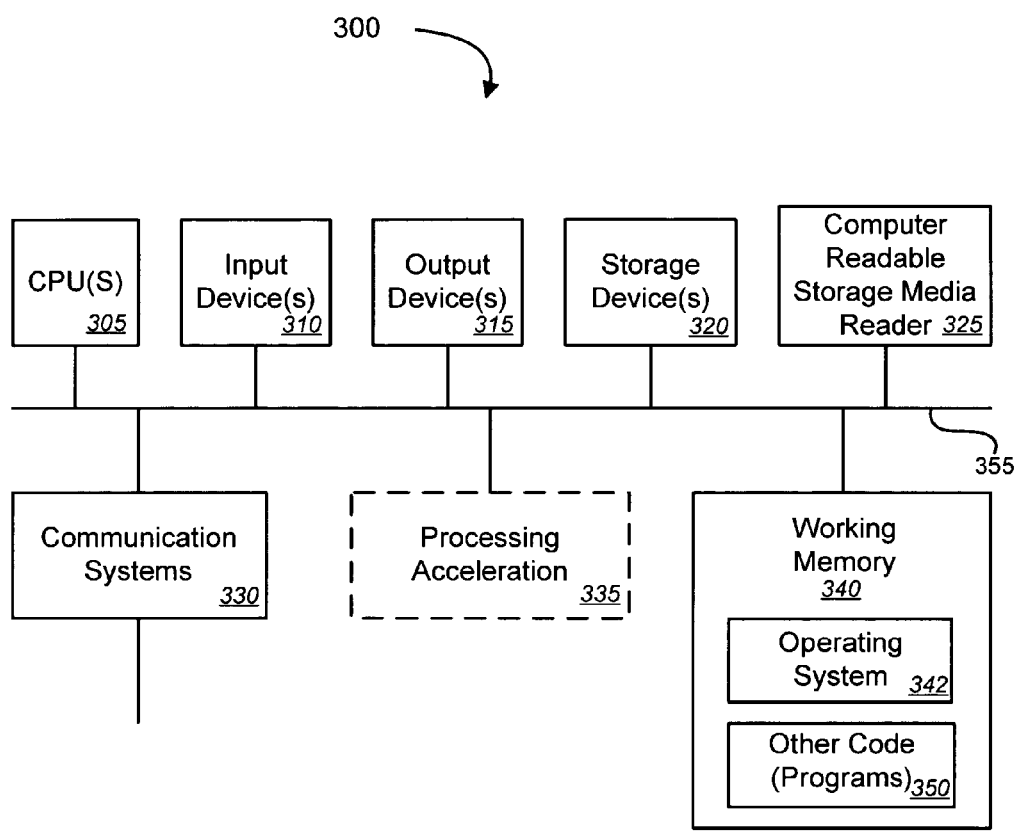
FIG. 3 is a block diagram illustrating an exemplary computer system in which embodiments of the present invention may be implemented.

FIG. 3 is a block diagram illustrating an exemplary computer system in which embodiments of the present invention may be implemented. This example illustrates one embodiment of a computer system 300 upon which elements of the environment 200 described above may be implemented. Alternatively, the system 300 may be used as a stand-alone system upon which software for allocating inventory as described herein may be executed. The computer system 300 is shown comprising hardware elements that may be electrically coupled via a bus 355. The hardware elements may include one or more central processing units (CPUs) 305; one or more input devices 310 (e.g., a mouse, a keyboard, etc.); and one or more output devices 315 (e.g., a display device, a printer, etc.). The computer system 300 may also include one or more storage device 320. By way of example, storage device(s) 320 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 325; a communications system 330 (e.g., a modem, a network card (wireless or wired), an infra-red communication device, etc.); and working memory 340, which may include RAM and ROM devices as described above. In some embodiments, the computer system 300 may also include a processing acceleration unit 335, which can include a DSP, a special-purpose processor and/or the like.

The computer-readable storage media reader 325 can further be connected to a computer-readable storage medium, together (and, optionally, in combination with storage device(s) 320) comprehensively representing remote, local, fixed, and/or removable storage devices plus storage media for temporarily and/or more permanently containing computer-readable information. The communications system 330 may permit data to be exchanged with the network 320 and/or any other computer described above with respect to the system 300.

The computer system 300 may also comprise software elements, shown as being currently located within a working memory 340, including an operating system 345 and/or other code 350, such as program code implementing a web service connector or components of a web service connector. It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed.

Software of computer system 300 may include code to perform inventory allocation according to various embodiments of the present invention. Allocation of inventory can include consideration of a number of user defined constraints such as, but not limited to, a total budget for inventory, target service levels, and/or minimum inventory levels for specified items at specified locations. Allocation of inventory across a number of locations in a given supply chain can then be performed in a number of different modes that take these user constraints into consideration to find an efficient allocation within the user's specified constraints.

User constraints may be entered, modes selected, and supply chain described through a user interface such as one or more web pages or other presentation. An exemplary user interface pages will be discussed below for illustrative purposes only. The interface presented here is not intended to be limiting as any number of interface types or formats are considered equally applicable to the various embodiments of the present invention.

Figure 4:
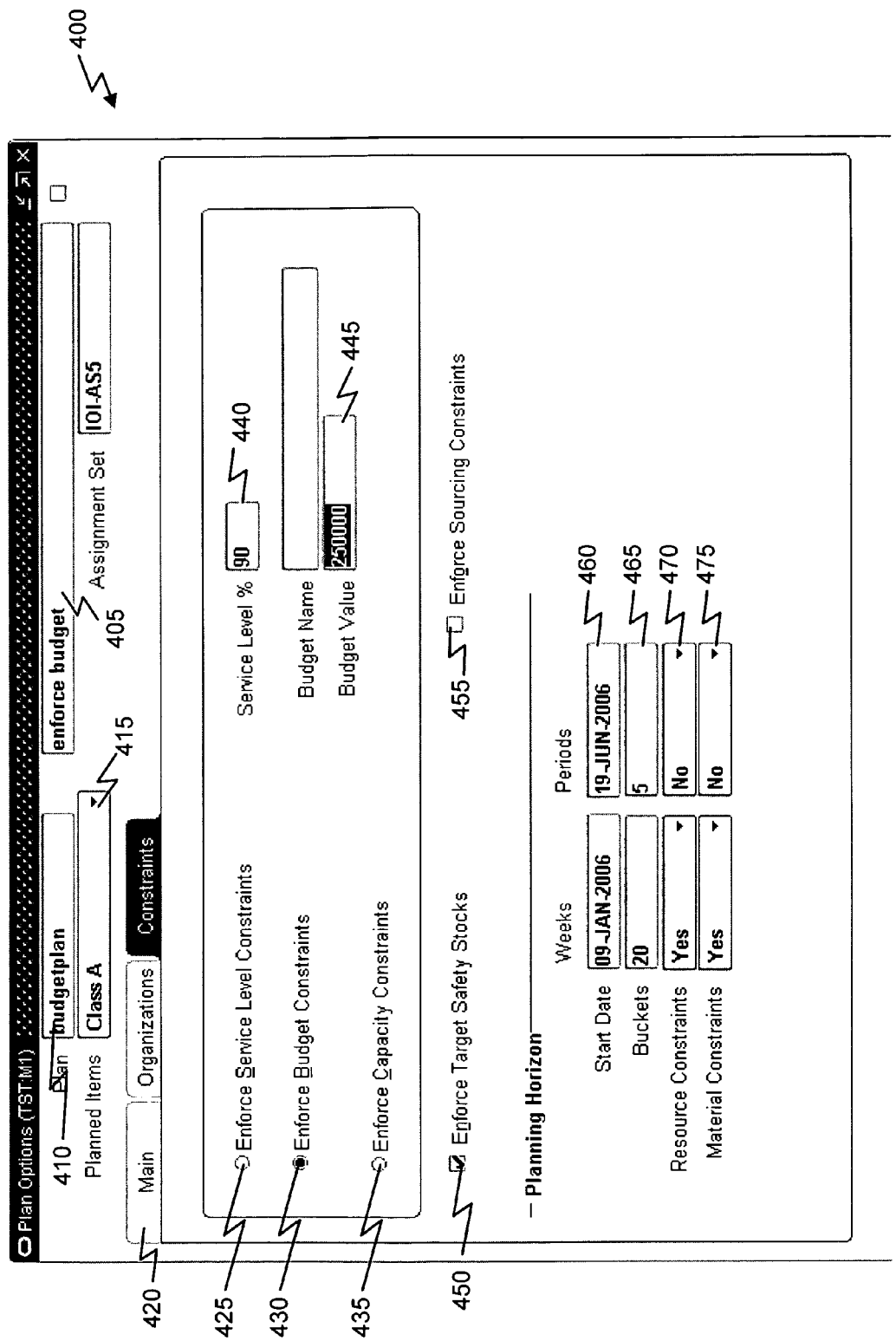
FIG. 4 illustrates an example of a user interface page for an inventory allocation program according to one embodiment of the present invention.

FIG. 4 illustrates an example of a user interface page for an inventory allocation program according to one embodiment of the present invention. In this example, a page 400 or window is displayed that includes an indication 405 of the currently selected mode in which allocation will be performed, a name 410 for a particular plan being developed or modified, and a combo box 415 for selecting and indicating a item being planned. A row of tabs 420 is also displayed and selectable by the user to navigate through different views or pages of the interface.

This page 400 also includes a set of radio buttons 425-435 for selecting the mode. Radio buttons are used here since, according to one embodiment of the present invention, the modes can be mutually exclusive. By selecting one of the radio buttons 425-435, a users can choose the mode of operation. As indicated here, the modes include an enforce service level mode 425, an enforce budget constraints mode 430, and an enforce capacity constraints mode 435. This screen 400 illustrates, by way of example, an enforce budget constraints mode. The service level can be defined via an input box 440 and a budget value can be specified by another input box 445. Alternatively, a budget list can be input in the budget names box which comprises budget values that apply to the entire plan, to specific organizations and/or to specific item categories. The user may also define inventory values and inventory ranges for certain items and choose whether to enforce these definitions based on the enforce target safety stocks check box 450. This page 400 also includes a number of input boxes 460-475 for entering dates defining a plan horizon as well as choosing one or more planning timebuckets or periods for the plan.

In other embodiments, the page 400 can be expanded or other pages, views, etc. can be provided to display additional information to or receive additional information from a user. For example, other pages can allow for defining penalties for such things as exceeding material, transportation, and resource capacities and for demand lateness. Additionally, a set of input boxes for safety stock change frequency can be presented through which a user can enter information used to smooth safety stock profiles. In yet another page or portion of the interface, a user may be able to define demand forecasts at a given organization to be used for inventory planning.

Regardless of the mode of operation, inventory allocation, according to one embodiment of the present invention, can be seen as a series of "runs" or processes of adjusting the inventory levels for each item at each location within the bounds set by the mode of operation and/or the constraints set by the user.

Figure 5:
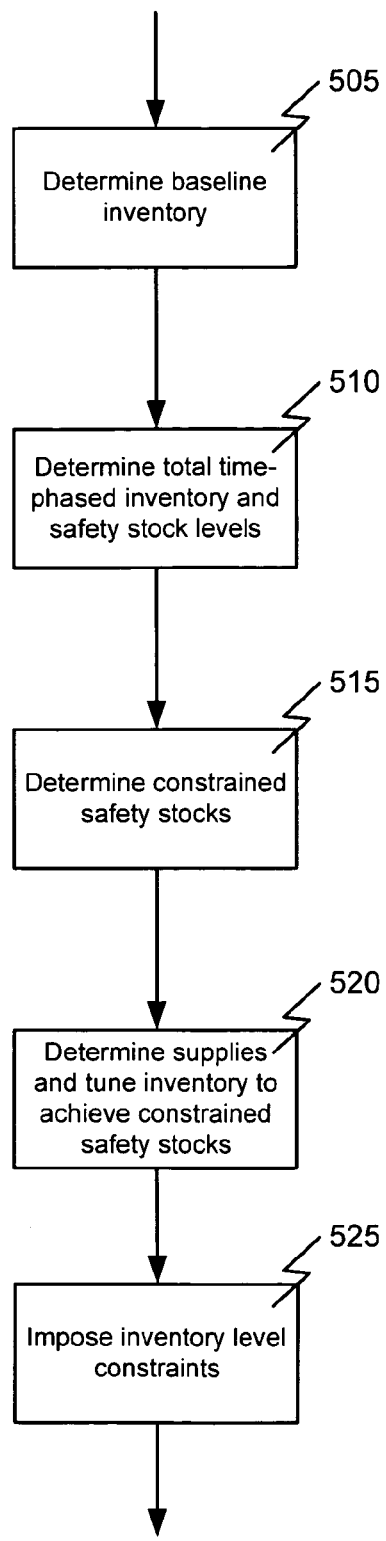
FIG. 5 is a flowchart illustrating, at a high level, an inventory allocation process according to one embodiment of the present invention.

FIG. 5 is a flowchart illustrating, at a high level, an inventory allocation process according to one embodiment of the present invention. In this example, allocation begins with determining 505 a baseline inventory for one or more items at each location in the supply chain. The baseline inventory can be based on expected values for demand for each of the one or more items and lead time for each location in the supply chain. This "first run" uses expected values of the forecasts and lead times to determine the starting point of the inventory calculations. According to one embodiment, no uncertainty is considered in the forecasts at this point and the solution can provide the sourcing selection, bill of materials, routing selections, component and resource selections and generation of supplies to meet expected demand values.

A total time-phased inventory and target safety stock level can then be determined 510 for each of the one or more items at each location in the supply chain. The total time-phased inventory and target safety stock level can be based on the baseline inventory, a target service level, a demand uncertainty level for each of the one or more items, a lead time uncertainty level for each location in the supply chain, and carrying costs in the supply chain. That is, in this second run, the target service level is used along with the demand and lead-time uncertainty for a given item to calculate target safety stocks and the total required time-phased inventory. The user-defined fixed inventory values and inventory limits can also be imposed at this stage.

A safety stock level can be determined 515 for each of the one or more items at each location in the supply chain. Determining 515 a safety stock level for each of the one or more items at each location in the supply chain can further be based on one or more user constraints and the profitability of storing each item at each location in the supply chain. The one or more user constraints can comprise an inventory level for at least one of the one or more items at one or more locations in the supply chain and/or a maximum budget for total inventory or capacity constraints which restrict material procurement, production, and/or transfer. If a maximum budget for total inventory is defined, determining a safety stock level for each of the one or more items at each location in the supply chain can comprise determining a safety stock level for each of the one or more items at each location in the supply chain that has a total inventory cost not greater than the maximum budget for total inventory.

The production, procurement, and transfer supplies for each of the one or more items at each location in the supply chain that is necessary to achieve these constrained safety stocks can then be determined 520. Determining the supplies and inventory level for each of the one or more items at each location in the supply chain can be based on one or more user constraints. The one or more user constraints can include an inventory level for at least one of the one or more items at one or more locations in the supply chain. For this fourth run 520, the demands can be lowered back to expected values, inventory variables can be lower bounded at values from the third run 515, the supply variables can be freed, and the user-defined inventory limits can be again imposed 525. The result is the final, tuned inventory levels that are within specified budgets while maximizing profitability.

Additionally, the overall, actual service level achieved with the tuned inventory levels for each of the one or more items at each location in the supply chain can be determined and reported. Similarly, an overall inventory cost at the tuned inventory level for each of the one or more items at each location in the supply chain can also be determined and reported.

According to one embodiment of the present invention, the inventory allocation process as described with reference to FIG. 4, can be operated in three possible modes. These modes can correspond to enforcement of budget constraints, service levels and capacity constraints. Additionally, the user is able to specify either inventory values or maximum and minimum allowable limits on inventory values for an item at a location. This specification can be in terms of quantity (number of units) or days of supply. Details of each mode will be discussed below with reference to FIGS. 6-8. Additionally, exemplary mathematical formulae for performing the various calculations described in will be listed in the description of the budget constraint mode of operation described with reference to FIG. 8.

Figure 6:
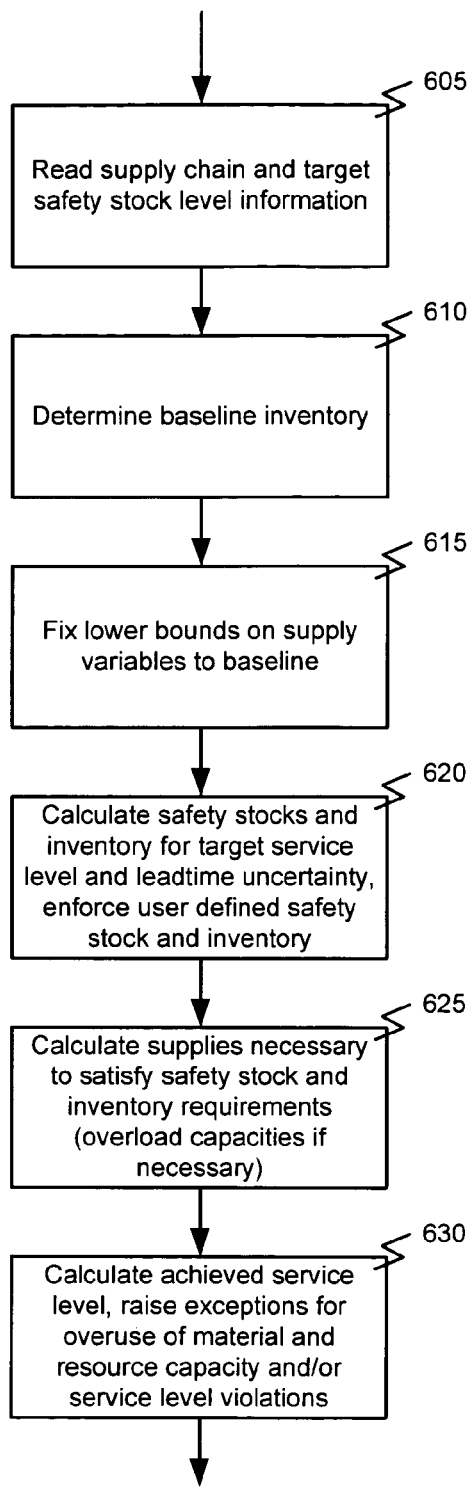
FIG. 6 is a flowchart illustrating additional details of the inventory allocation process illustrated in FIG. 5 when operated in a target service level enforcing mode according to one embodiment of the present invention.

FIG. 6 is a flowchart illustrating additional details of the inventory allocation process illustrated in FIG. 5 when operated in a target service level enforcing mode according to one embodiment of the present invention. In this example, the supply chain and target safety stock level information is read 605. That is, the user can input a target service level and the system can calculate inventory values that achieve this service level. According to one embodiment, material and transport capacities can be overused if necessary to achieve this service level. However, user defined inventory values or minimum and maximum inventory limits can be treated as a hard constraint. These are more detailed item-level specifications compared to plan level specifications and hence can be given precedence over service level requirements. According to one embodiment, the target service level may be violated if necessary to accommodate these specifications.

A baseline inventory for one or more items at each location in the supply chain can be determined 610. The baseline inventory can be based on expected values for demand for each of the one or more items and lead time for each location in the supply chain. This "first run" uses expected values of the forecasts and lead times to determine the starting point of the inventory calculations. According to one embodiment, no uncertainty is considered in the forecasts at this point and the solution provides the sourcing selection, bill of materials, routing selection, component and resource selection and generation of supplies to meet expected demand values. The lower bounds of supply variables can be set 615 to this baseline.

A total time-phased inventory and target safety stock level can then be determined 620 for each of the one or more items at each location in the supply chain. The total time-phased inventory and target safety stock level can be based on the baseline inventory, a target service level, a demand uncertainty level for each of the one or more items, a lead time uncertainty level for each location in the supply chain and carrying costs in the supply chain. That is, in this second run, the target service level can be used along with the demand and lead-time uncertainty for a given item to calculate the total required time-phased inventory and target safety stock. The user-defined fixed inventory values and inventory limits can also be imposed at this stage. The supply variables can be lower bounded at the deterministic solution.

The supplies necessary to meet the target safety stock levels can be calculated 625. Resource and material capacities may be overloaded to achieve these levels. User defined inventory constraints can again be imposed in this step and these may cause the target service level to be violated.

The achieved service level corresponding to the final inventory values can be calculated 630 and exceptions can be raised in case material and/or resource capacity is overused and/or the target service level is violated.

Figure 7:
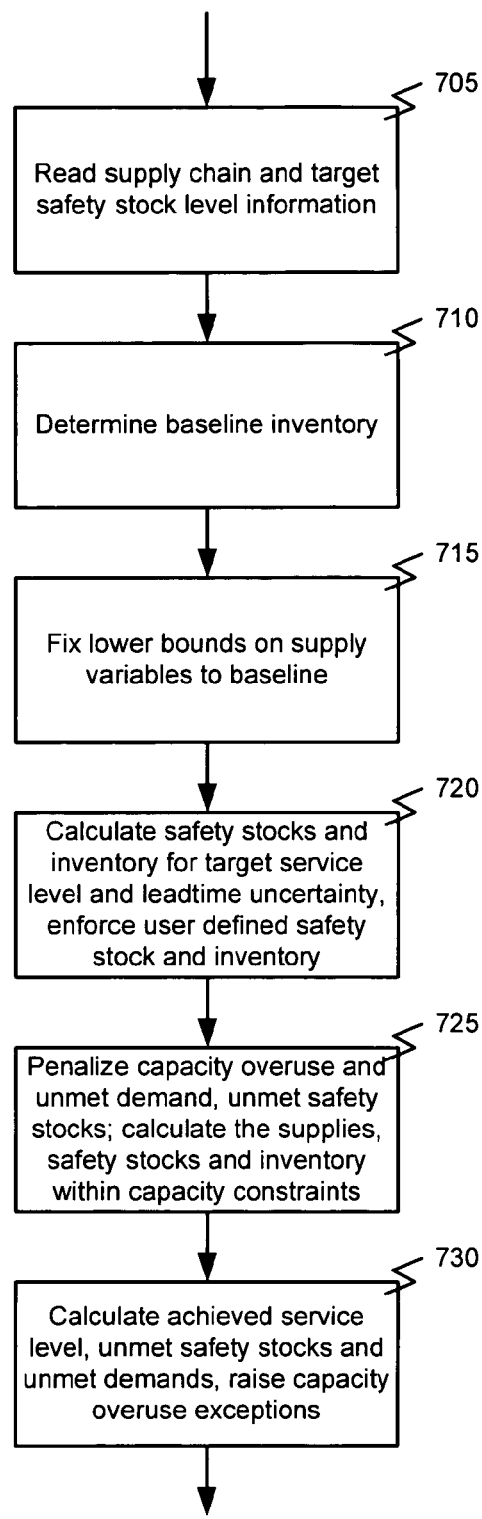
FIG. 7 is a flowchart illustrating additional details of the inventory allocation process illustrated in FIG. 5 when operated in a capacity constraint enforcing mode according to one embodiment of the present invention.

FIG. 7 is a flowchart illustrating additional details of the inventory allocation process illustrated in FIG. 5 when operated in a capacity constraints enforcing mode according to one embodiment of the present invention. In this example, the supply chain and target safety stock level information is read 705. That is, the user can input a target service level and the system can calculate inventory values that achieve this service level. According to one embodiment, in the capacity constraint enforcing mode, material and transport capacities can not be overused. So the material, transportation and resource capacity constraints can be treated as hard constraints. Additionally user defined inventory values or minimum and maximum inventory limits can be treated as a hard constraint. These are more detailed item-level specifications compared to plan level specifications and hence can be given precedence over capacity constraint and service level requirements. According to one embodiment, the target service level may be violated if necessary to accommodate these specifications.

A baseline inventory for one or more items at each location in the supply chain can be determined 710. The baseline inventory can be based on expected values for demand for each of the one or more items and lead time for each location in the supply chain. This "first run" uses expected values of the forecasts and lead times to determine the starting point of the inventory calculations. According to one embodiment, no uncertainty is considered in the forecasts at this point and the solution provides the sourcing selection, bill of materials, routing selection, component and resource selection and generation of supplies to meet expected demand values. The lower bounds of supply variables can be set 715 to this baseline.

A total time-phased inventory and target safety stock level can then be determined 720 for each of the one or more items at each location in the supply chain. The total time-phased inventory can be based on the baseline inventory, a target service level, a demand uncertainty level for each of the one or more items, a lead time uncertainty level for each location in the supply chain and carrying costs in the supply chain. That is, in this second run, the target service level can be used along with the demand and lead-time uncertainty for a given item to calculate the total required time-phased inventory and target safety stock level. The user-defined fixed inventory values and inventory limits can also be imposed at this stage. The supply variables can be lower bounded at the deterministic solution.

Capacity overuse can be penalized heavily 725 and, according to one embodiment of the present invention, can be overused only by user defined constraints on inventory. Smaller penalties can be imposed on unmet demands and unmet safety stocks which may arise due to capacity constraints being imposed as hard constraints. The supplies necessary to achieve the capacity constrained safety stock levels are calculated 725 and final inventory values are tuned to respect user defined inventory constraints.

The service level achieved by the final tuned inventory levels can be calculated 730 and any capacity overuse can be flagged by exceptions.

Figure 8:
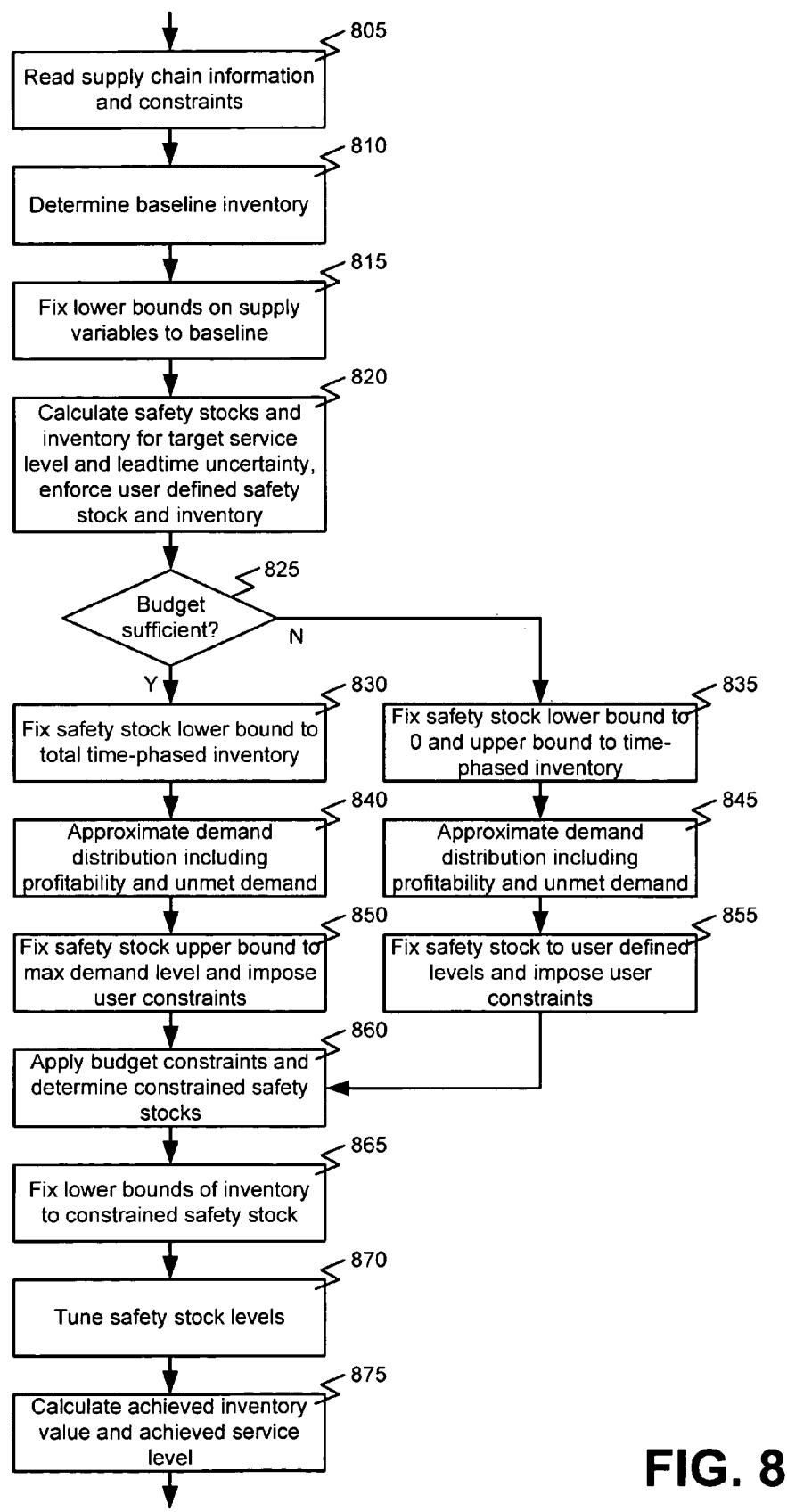
FIG. 8 is a flowchart illustrating additional details of the inventory allocation process illustrated in FIG. 5 when operated in a budget constraint enforcing mode according to one embodiment of the present invention.

FIG. 8 is a flowchart illustrating additional details of the inventory allocation process illustrated in FIG. 5 when operated in a budget constraint enforcing mode according to one embodiment of the present invention. The budget constrained inventory allocation procedure according to various embodiments of the present invention allows the user to specify budgets on total inventory value at various levels, such as a budget at the plan level which applies to all planned items, budgets applicable only to certain organizations in the supply chain and budgets applicable only to certain categories of items. These budgets can be defined in terms of limits on the capital tied up in inventory which applies in each time period across the chosen plan horizon. The user can also specify a target service level which they would like to enforce if the budget allows. As discussed above, the procedure determines the inventory levels in a sequence of optimization runs where the solution of a run serves as the starting point for the next run.

For illustrative purposes only some exemplary mathematical formulae will be provided below. These examples are not intended to limit the scope of the present invention since other formulae may also be used within the scope of the present invention. Furthermore, while described with reference to inventory allocation operated in a budget constraint mode, these formulae are considered equally applicable to previously discussed modes of operation. Some terms used throughout the formulae that follow will now be described.

Constant values used throughout these formulae are:

| | |
|---|---|
| $k_{target}$ | Safety factor for (target) service level from Normal distribution. |
| $k_{max}$ | Safety factor for (maximum) service level from Normal distribution (maximum demand outcome event). |
| $\sigma$ | Standard deviation of forecast error. |
| $\sigma_{LT}$ | Standard deviation of lead time. |
| $cumLT_{i,g}$ | Cumulative leadtime for item i, org g. |
| $U_{A,B}$ | Usage of units of B to produce 1 unit of A at org 1. |
| TQPIPDS | Production variable value in deterministic solution. |
| XUITCDS | Inter-Organizational material transfer value in deterministic solution. |
| $ARU_{i,g,r}$ | Resource usage of resource r in organization g by item i. |
| $RACL_{r,t,g}$ | Resource availability for resource r, timebucket t, org g. |
| $XPSS_{target}$ | Safety stock value from target service level run. |
| BUD | Budget value per timebucket, defined at the plan level. |
| $BUD_I$ | Budget value per timebucket (item category level). |
| $BUD_g$ | Budget value per timebucket (organization level). |
| $PCU_d$ | Penalty cost of unmet demand d. |
| $PCL_d$ | Penalty cost of late demand d. |
| PCSC | Penalty cost of substitute component. |
| PCAR | Penalty cost of alternate resource. |
| PCAP | Penalty cost of alternate process. |
| PCBU | Penalty cost of budget underuse. |
| PCBO | Penalty cost of budget overuse. |
| $PCRS_r$ | Penalty cost for overuse of resource r. |
| $SC_{i,g}$ | Standard Cost (item-org). |
| $CC_{i,g,t}$ | Carrying Cost Percentage (item-org). |
| $XPALB_{i,g,}$ | User input lower bound on inventory level. |
| $XPAUB_{i,g,}$ | User input upper bound on inventory level. |
| $UISS_{i,g,}$ | User input safety stock values. |

Variable values used throughout these formulae are:

| | |
|---|---|
| $\mu_{i,g,t}$ | Independent demand for item i, org g, timebucket t. |
| $XPA_{i,g,t}$ | Projected available balance for item i, org g, timebucket t. |
| $XFIDQ_{i,g,d,t}$ | Supply towards independent demand. |
| $SIDQ_{i,g,t}$ | Demand satisfaction slack. |
| $TQPIP_{i,g,t}$ | Production of item i at org g in timebucket t. |
| $XUITC_{i,g,g',t}$ | Inter-organizational transfer of item i from org g to org g' in timebucket t. |
| $XVITC_{i,g,t}$ | Supply from external vendor of item i to org g in timebucket t. |
| $TQCO_{i,g,t}$ | Dependent demand from parent item for component item i at org g in t. |
| $XCOCRV_{i,g,t,r}$ | Resource consumption variable (producing item i, g consumes resource r at time t). |
| $XPSS_{i,g,t}$ | Safety stock held for item i, org g, timebucket t. |
| $SBUD_U$ | Budget underuse slack. |
| $SBUD_o$ | Budget overuse slack. |
| $SPIDQ_{t,d'}$ | Budget demand slacks (unmet demand if the probabilistic event $\{d = d'\}$ occurs, where the d' is a scenario of uncertain demand d. |
| $SSSQ_{i,g,t}$ | Safety stock slack for item i in org in time bucket t. |
| $MAXSS_d$ | Safety stock with maximum service level. |
| $SRACL_{r,t,g}$ | Resource availability slack. |
| m | Riskpooling factor |
| $SS_x$ | Overall safety stock to buffer against all uncertainty forms |
| $SS_d$ | Portion of safety stock to buffer against demand uncertainty |
| $SS_{MLT}$ | Portion of safety stock to buffer against make leadtime uncertainty |
| $SS_{TLT}$ | Portion of safety stock to buffer against in-transit leadtime uncertainty |
| $SS_{SUP}$ | Portion of safety stock to buffer against supplier uncertainty |

Returning to the example illustrated in FIG. 8, the supply chain target safety level information is read 805. That is, the user can input a target service level and the system can calculate inventory values that achieve this service level. According to one embodiment, material and transport capacities can be overused if necessary to achieve this service level. However, user defined inventory values or minimum and maximum inventory limits can be treated as a hard constraint. These are more detailed item-level specifications compared to plan level specifications and hence can be given precedence over service level requirements. According to one embodiment, the target service level may be violated if necessary to accommodate these specifications.

A baseline inventory for one or more items at each location in the supply chain can be determined 810. The baseline inventory can be based on expected values for demand for each of the one or more items and lead time for each location in the supply chain. This "first run" uses expected values of the forecasts and lead times to determine the starting point of the inventory calculations. No uncertainty is considered in the forecasts at this point and the solution provides the sourcing selection, bill of materials, routing selection, component and resource selection and generation of supplies to meet expected demand values. The lower bounds of supply variables can be set 815 to this baseline.

Therefore, the deterministic first run can calculate the supplies which minimize the overall carrying cost as:

$$\min \sum_{i,g,t} SC_{i,g} * CC_{i,g,t} * XPA_{i,g,t}$$

subject to $$\sum_{T=t}^{T+\max \text{Lateness}} XFIDQ_{i,g,T} + SIDQ_{i,g,t} = \mu_{i,g,t}$$

$$XPA_{i,g,t} = XPA_{i,g,t-1} + TPPIP_{i,g,t} + XUITC_{i,g',g,t} +$$
$$XVITC_{i,g,t} - XFIDQ_{i,g,t} - TQCO_{i,g,t} - XUITC_{i,g,g'',t}$$

$$TQCO_{i',g,t} - U_{i,i'} * TQPIP_{i,g,t} = 0$$

$$XCOCRV_{i,g,t,r} - ARU_{i,g,r} * TQPIP_{i,g,t} = 0$$

Additionally, the objective function can also include penalties on:

1) Resource capacity overuse:

$$\min \sum_r PCRS_r * SRACL_r$$

This term penalizes resource capacity overuse in the presence of capacity constraints.

2) Late demands: demand lateness can be penalized by user-controlled penalty factors.

$$\min \sum_d PCL_d * XFIDQ_{i,g,d,t}$$

3) Penalties on use of substitute components, alternate processes and alternate resources:

$$\min \left( \sum_{subst\ comp} PCSC * TQCO_{i,g,t} + \sum_{altprocesses} PCAP * TQPIP_{i,g,t} + \sum_{altresources} PCAR * XCOCRV_{i,g,t,r} \right)$$

A total time-phased inventory and target safety stock level can then be determined 820 for each of the one or more items at each location in the supply chain. The total time-phased inventory and target safety stock level can be based on the baseline inventory, a target service level, a demand uncertainty level for each of the one or more items, a lead time uncertainty level for each location in the supply chain, and carrying costs in the supply chain. That is, in this second run, the target service level can be used along with the demand and lead-time uncertainty for a given item to calculate the total required time-phased inventory. The user-defined fixed inventory values and inventory limits can also be imposed at this stage. The supply variables can be lower bounded at the deterministic solution.

The safety stocks can be modeled as free supply available in each XPA equation and calculated in this run. The demand can be amplified by the target safety stock required. The objective function involves carrying costs on the total inventory including safety stock. User-defined inventory levels and safety stock values can also be modeled.

Postponement can be accomplished according to the following formulae:

Max Safety Stock at level 0 item:

$$TSS_0 = k_{target,0} * \sigma * \sqrt{cumLT_0}$$

Safety stock at level 0 item with max postponement:

$$SS_0 = TSS_0 * \sqrt{\frac{LT_0}{cumLT_0}}$$

Max safety stock at level i item:

$$TSS_i = TSS_{i-1} - SS_{i-1}$$

safety stock at level i item with max postponement cumLT at level i item is:

$$cumLT_i = \sum_{k=i}^{N} LT_K$$

where:
i: index of the level of depth for the item-org in the supply chain
i=0 for the end item,
i=N for leaf node The safety stock for make/transfer/supplier leadtime uncertainty can be calculated using the leadtime standard deviation:

$$SS_{LT} = K * \sigma_{LT} * \mu_{i,g,t}$$

where:
safety factor K for the item-org can be obtained by propagating the target service level from the end-items. This propagation is done as follows:

$$SL(child) = \beta * SL(parent) + (1-\beta) * (SL(parent)^{(1/n)})$$

where n=number of children
β=degree of correlation (ranging from 0 to 1 with a default value of 0.5). This value can be controlled by the user.

The user can specify the $\sigma_{LT}$ directly in the manufacturing/in-transit/supplier leadtimes.

The $\mu_{i,g,t}$ is the independent or dependent demand for the item.

To obtain the overall safety stock $SS_x$, we independently calculate $SS_{LT}$ and pool it with $SS_d$ (the safety stock used to buffer against demand uncertainty).

$$SS_x = \sqrt{SS_d^2 + SS_{Sup}^2 + SS_{MLT}^2 + SS_{TLT}^2}$$

The linear program that is solved in this run thus is:

$$\min \sum_{i,g,t} SC_{i,g,t} * CC_{i,g,t} * (XPA_{i,g,t} + XPSS_{i,g,t})$$

subject to:

$$\sum_{T=t}^{T+\max Late} XFIDQ_{i,g,T} + SIDQ_{i,g,t} = \mu_{i,g,t} + TSS_{i,g,t} \quad \forall\ top\_level\_item\ (i,g)$$

$$XPA_{i,g,t} = XPA_{i,g,t-1} + m * XPSS_{i,g,t} + TPPIP_{i,g,t} + XUITC_{i,g',g,t} + XVITC_{i,g,t} - XFIDQ_{i,gt} - TQCO_{i,g,t} - XUITC_{i,g,t}$$

$$XPSS_{i,g,t} = UISS_{i,g} \quad \forall\ (i,g)\ with\_user\_input\_safety\_stock\_level$$

$$XPALB_{i,g} \leq XPA_{i,g,t} + XPSS_{i,g,t} \leq XPSUB_{i,g} \quad \forall\ (i,g)\ with\_user\_input\_inventory\_level$$

The effect of multiple independent demands occurring for a given item at a given location is to reduce the amount of safety stock that is necessary to buffer against these demands. Since these demands may be considered independent of each other, the likelihood of their corresponding demand uncertainties being simultaneously high is low, hence the total safety stock needed to buffer against them is less than the sum of the safety stocks required for each demand separately. The variances of independent demands may be added, i.e. for 2 demands d1 and d2, we have:

$$\sigma_{pooled}^2 = \sigma_{d1}^2 + \sigma_{d2}^2$$

Thus the pooled safety stock corresponding to this effective pooled variance is:

$$SS_{unpooled} = SS_{d1} + SS_{d2} = K * \sigma_{d1} * \sqrt{cumLT} + K * \sigma_{d2} * \sqrt{cumLT}$$

$$SS_{pooled} = K * \sigma_{pooled} * \sqrt{cumLT} =$$
$$K * \sqrt{(\sigma_{d1}^2 + \sigma_{d2}^2)} * \sqrt{cumLT} <= K * (\sigma_{d1} + \sigma_{d2}) * \sqrt{cumLT} =$$
$$SS_{unpooled}$$

The riskpooling factor 'm' is introduced into the formulation to accomplish riskpooling. The effect of the factor 'm' is to amplify the actual riskpooled safety stock that is held into a larger number. Given safety stock upper bounds (maximum values) $UB_{d1}$ and $UB_{d2}$ corresponding to the two demands d1 and d2 as determined by the postponement logic in 0077, we have:

$$m = \frac{UB_{d1} + UB_{d1}}{\sqrt{UB_{d1}^2 + UB_{d2}^2}}$$

Effectively, the safety stock held at an item at a location is the riskpooled sum of the safety stocks that would have been held for each independent demand stream occurring at that item-location.

A determination 825 can then be made as to whether the target service level is met with the total time-phased inventory. If 825 the target service level is met, the lower bounds on the safety stock levels can be set 830 to the total time phased inventory. A demand distribution can then be approximated 840 including profitability and unmet demand. The safety stock upper bounds can then be set 850 to the maximum demand levels.

If 825 the target service level is not met with the total time-phased inventory, the lower bounds on the safety stock levels can be set 835 to zero and the upper limits can be set to the total time phased inventory. A demand distribution can then be approximated 845 including profitability and unmet demand. The user-defined safety stocks can then be set 855 to user defined levels and user-defined inventory levels can be imposed.

The budget constraints are imposed and a safety stock level can be determined 860 for each of the one or more items at each location in the supply chain. Determining 860 a safety stock level for each of the one or more items at each location in the supply chain can be based on one or more user constraints that can include an inventory level for at least one of the one or more items at one or more locations in the supply chain and/or a maximum budget for total inventory. If a maximum budget is specified, determining a safety stock level for each of the one or more items at each location in the supply chain can comprise determining a safety stock level for each of the one or more items at each location in the supply chain that has a total inventory cost not greater than the maximum budget for total inventory. The lower bounds of inventory for each of the one or more items at each location in the supply chain is then set 865 to the budget constrained safety stock.

Therefore, a linear program can be obtained by adding/modifying constraints and adding additional terms to the objective function from the target service level run. The additional constraints and objective function terms are outlined below.

Budget Constraints:

$$\sum_{i,g} (XPA_{i,g,t} + XPSS_{i,g,t}) * SC_{i,g} + SBUD_U - SBUD_O = BUD \quad \forall t$$

$$\sum_{i \in I, g} (XPA_{i,g,t} + XPSS_{i,g,t}) * SC_{i,g} + SBUD_U - SBUD_O = BUD_I \quad \forall I, \forall t$$

$$\sum_{i \in g} (XPA_{i,g,t} + XPSS_{i,g,t}) * SC_{i,g} + SBUD_U - SBUD_O = BUD_g \quad \forall g, \forall t$$

Fulfill independent demand:

$$MAXSS_d = k_{max} * \sigma * \sqrt{cumLT}$$

$$\sum_{\substack{t \\ i=i(d), g=g(d)}} XFIDQ_{i,g,d,t} + \sum_i SPIDQ_{i,d} = \mu_d + MAXSS_d \quad \forall d$$

$$ki >= SPIDQ_i > 0$$

where
$k_i = (3*\sigma)/nd$
nd=number of segments that the demand is linearized into Additionally, the lower/upper bounds on the XPSS can be changed depending on whether the budget is deficit or surplus.

deficit case: $XPSS_{i,g,t} <= XPSS_{target}$
surplus case: $XPSS_{i,g,t} >= XPSS_{target}$ The following terms can be added to the objective function:
1) Cost of Stochastic unmet demand:

$$\min \sum_d \sum_{d' \in d} PCU_d * \max((d' - XFIDQ_{t(d)}), 0) * Prob(d')$$

which is equivalent to the following LP formulation:

$$\min \sum_d \sum_{d' \in d} PCU_d * SPIDQ_{d'} * Prob(d')$$

s.t.

$$SPIDQ_{d'} \geq d' - XFIDQ_{t(d)}$$

$$SPIDQ_{d'} \geq 0$$

This allows the average total shortage cost to be minimized.

$PCU_d$=selling price−standard cost for the demand item
2) Budget overuse and underuse slacks:

$$\min \sum_{budgets} (PCBO * SBUD_O + PCBU * SBUD_U)$$

This ensures budgets are used up completely and are not exceeded.

The production, procurement and transfer supplies to achieve these budget constrained safety stocks can then be determined and the final inventory can be tuned to respect user inventory constraints. Tuning the safety stock level for each of the one or more items at each location in the supply chain can be based on one or more user constraints including an inventory level for at least one of the one or more items at one or more locations in the supply chain. For this fourth and final run 870, the demands can be lowered back to expected values, inventory variables can be lower bounded at values from the third run 860, the supply variables can be freed, and the user-defined inventory limits can be again imposed. The result is the optimal inventory levels that are within specified budgets while maximizing profitability.

Additionally, the following constraints can be added:

Fulfill safety stock requirement $$XPA_{i,g,t} + SSSQ_{i,g,t} \geq XPSS_{i,g,t} \; \forall i,g,t$$

The objective function can also be modified to include WIP inventory:

Carrying Cost:

$$\min \sum_{i,g,t} XPA_{i,g,t} * SC_{i,g} * CC_{i,g} + \sum_{i,g,t} XUITC_{i,g,t} * SC_{i,g} * CC_{i,g} + \sum_{i,g,t} 0.5 * TQPIP_{i,g,t} * SC_{i,g} * CC_{i,g}$$

In this way the carrying cost objective term penalizes the inventory held for item-orgs, the in-transit inventory as well as the production WIP inventory.

Finally, the actual total budget (inventory value) and the actual achieved service level can be calculated 875 based on the final inventory levels.

In summary, the budget constraint mode of operation can consist of a two-step procedure. In the first step, the user-specified budget can be checked against the inventory level required to cover user-specified inventory values and ranges and to meet user-specified target service levels. The system can determine if the budget is sufficient to meet these targets. If the user does not specify any value for the target service level, a default service level, 50% for example, can be assumed corresponding to mean demand.

If the budget is deficit, safety stocks obtained from the second run can be set as upper bounds for the budget constrained safety stocks and user-defined inventory values and ranges can also be enforced. Profit maximization can be achieved by linearizing the demand and minimizing expected profitability-weighted unmet demand.

If the budget is surplus, the safety stock values from the second run can be considered as a minimum level to be maintained and the surplus budget can be allocated optimally in the second step of the procedure. The objectives of the optimization can be the same as for the deficit case, i.e. profit maximization and minimization of carrying costs and capacity overuse penalties.

In the second step, the engine can be run with a very high, 99.9% for example, service level and the safety stocks calculated can be constrained by the budget. The objective can be to distribute the budget while minimizing a combination of expected profitability-weighted unmet demand, inventory carrying costs and resource capacity overuse penalties. The budget constraints can be imposed on the total inventory standard cost per timebucket at a plan, item category, organization or organization-category level (depending upon the chosen budget level). This constraint limits the total physical value of the assets that can be carried at any given time over the entire plan horizon.

Therefore the safety stock can be allocated based on the expected profitability-weighted unmet demand and corresponding penalty cost, subject to a budget constraint. Thus more likely demand scenarios with more profitable demands are preferentially allotted in the budget. The carrying cost objective can be used to differentiate between safety stock held at end-items versus component levels and to accomplish postponement In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of allocating inventory across a plurality of locations in a supply chain, the method comprising:

calculating using a computer of a warehouse management system a baseline inventory for one or more items at each location in the supply chain based on expected values for demand for each of the one or more items and lead time for each location in the supply chain;

making a first adjustment to an inventory level for each item at each location using the computer of the warehouse management system, the first adjustment based on the baseline inventory;

calculating using the computer of the warehouse management system a total time-phased inventory and target safety stock level for each of the one or more items at each location in the supply chain based on the baseline inventory, a target service level, a demand uncertainty level for each of the one or more items, a lead time uncertainty level for each location in the supply chain carrying costs in the supply chain, a maximum safety stock value, and a maximum postponement value, and wherein calculating the total time-phased inventory and target safety stock level further comprises calculating a risk pooling factor based on the maximum postponement value and propagating the demand uncertainty levels for each of the one or more items and the lead time uncertainty for each location across the supply chain;

making a second adjustment to the inventory level for each item at each location using the computer of the warehouse management system, the second adjustment based on the inventory level of each item at each location after the first adjustment and the total time-phased inventory and target safety stock level for each of the one or more items;

calculating using the computer of the warehouse management system a constrained safety stock level for each of the one or more items at each location in the supply chain based on the target safety stock level, one or more user constraints, and a profitability of storing each item at each location in the supply chain;

making a third adjustment to the inventory level for each item at each location using the computer of the warehouse management system, the third adjustment based on the inventory level of each item at each location after the second adjustment and the constrained safety stock level for each of the one or more items;

calculating using the computer of the warehouse management system production, procurement and transfer supplies to achieve the constrained safety stock level for each of the one or more items at each location in the supply chain based on the one or more user constraints; and making a fourth adjustment to the inventory level for each item at each location using the computer of the warehouse management system, the fourth adjustment based on the inventory level of each item at each location after the third adjustment and the production, procurement, and transfer supplies.

2. The method of claim 1, wherein the one or more user constraints comprise an inventory level for at least one of the one or more items at one or more locations in the supply chain.

3. The method of claim 1, wherein the one or more user constraints comprise a maximum budget for total inventory.

4. The method of claim 3, wherein calculating the safety stock level for each of the one or more items at each location in the supply chain further comprises calculating a safety stock level for each of the one or more items at each location in the supply chain that has a total inventory cost not greater than the maximum budget for total inventory.

5. The method of claim 1, further comprising calculating using the computer of the warehouse management system a tuned inventory allocation across the plurality of locations in the supply chain for a user defined time period based on the total time-phased inventory, the constrained safety stock level for each of the one or more items at each location in the supply chain, and the user constraints, wherein the user constraints are selected from a group consisting of budget constraints, service level constraints, and capacity constraints.

6. The method of claim 5, further comprising calculating using the computer of the warehouse management system an overall actual service level achieved with the tuned inventory allocation for each of the one or more items at each location in the supply chain.

7. The method of claim 5, further comprising calculating using the computer of the warehouse management system an overall inventory cost at the tuned inventory allocation for each of the one or more items at each location in the supply chain.

8. The method of claim 5, wherein making the first adjustment, second adjustment, third adjustment, and fourth adjustment to the inventory level for each item at each location are each further based on the user constraints.

9. The method of claim 1, wherein calculating the tuned inventory allocation across the plurality of locations in the supply chain is performed after making the fourth adjustment to the inventory level for each item at each location.

10. The method of claim 9, wherein the user constraints are selected based on a user selected mode.

11. A machine-readable medium having stored thereon a series of instructions which, when executed by a processor, cause the processor to allocate inventory across a plurality of locations in a supply chain by:

calculating a baseline inventory for one or more items at each location in the supply chain based on expected values for demand for each of the one or more items and lead time for each location in the supply chain;

making a first adjustment to an inventory level for each item at each location based on the baseline inventory;

calculating a total time-phased inventory and target safety stock level for each of the one or more items at each location in the supply chain based on the baseline inventory, a target service level, a demand uncertainty level for each of the one or more items, a lead time uncertainty level for each location in the supply chain carrying costs in the supply chain, a maximum safety stock value, and a maximum postponement value, and wherein calculating the total time-phased inventory and target safety stock level further comprises calculating a risk pooling factor based on the maximum postponement value and propagating the demand uncertainty levels for each of the one or more items and the lead time uncertainty for each location across the supply chain;

making a second adjustment to the inventory level for each item at each location based on the inventory level of each item at each location after the second adjustment and the total time-phased inventory and target safety stock level for each of the one or more items;

calculating a constrained safety stock level for each of the one or more items at each location in the supply chain based on the target safety stock level, one or more user constraints, and a profitability of storing each item at each location in the supply chain;

making a third adjustment to the inventory level for each item at each location based on the inventory level of each item at each location after the second adjustment and the constrained safety stock level for each of the one or more items;

calculating production, procurement and transfer supplies to achieve the constrained safety stock level for each of the one or more items at each location in the supply chain based on the one or more user constraints; and making a fourth adjustment to the inventory level for each item at each location based on the inventory level of each item at each location after the third adjustment and the production, procurement, and transfer supplies.

12. The machine-readable medium of claim 11, wherein the one or more user constraints comprise an inventory level for at least one of the one or more items at one or more locations in the supply chain.

13. The machine-readable medium of claim 11, wherein the one or more user constraints comprise a maximum budget for total inventory.

14. The machine-readable medium of claim 13, wherein calculating the safety stock level for each of the one or more items at each location in the supply chain further comprises calculating a safety stock level for each of the one or more items at each location in the supply chain that has a total inventory cost not greater than the maximum budget for total inventory.

15. The machine-readable medium of claim 11, further comprising calculating a tuned inventory allocation across the plurality of locations in the supply chain for a user defined time period based on the total time-phased inventory, the constrained safety stock level for each of the one or more items at each location in the supply chain, and the user constraints, wherein the user constraints are selected from a group consisting of budget constraints, service level constraints, and capacity constraints.

16. The machine-readable medium of claim 15, wherein making the first adjustment, second adjustment, third adjustment, and fourth adjustment to the inventory level for each item at each location are each further based on the user constraints.

17. A system comprising:
a processor; and
a memory coupled with and readable by the processor and containing a series of instruction that, when executed by the processor cause the processor to allocate inventory across a plurality of locations in a supply chain by calculating a baseline inventory for one or more items at each location in the supply chain based on expected values for demand for each of the one or more items and lead time for each location in the supply chain, making a first adjustment to an inventory level for each item at each location based on the baseline inventory; calculating a total time-phased inventory and target safety stock level for each of the one or more items at each location in the supply chain based on the baseline inventory, a target service level, a demand uncertainty level for each of the one or more items, a lead time uncertainty level for each location in the supply chain carrying costs in the supply chain, a maximum safety stock value, and a maximum postponement value, and wherein calculating the total time-phased inventory and target safety stock level further comprises calculating a risk pooling factor based on the maximum postponement value and propagating the demand uncertainty levels for each of the one or more items and the lead time uncertainty for each location across the supply chain; making a second adjustment to the inventory level for each item at each location based on the inventory level of each item at each location after the first adjustment and the total time-phased inventory and target safety stock level for each of the one or more items; calculating a constrained safety stock level for each of the one or more items at each location in the supply chain based on the target safety stock level, one or more user constraints, and a profitability of storing each item at each location in the supply chain; making a third adjustment to the inventory level for each item at each location based on the inventory level of each item at each location after the second adjustment and the constrained safety stock level for each of the one or more items; calculating production, procurement and transfer supplies to achieve the constrained safety stock level for each of the one or more items at each location in the supply chain based on the one or more user constraints; and making a fourth adjustment to the inventory level for each item at each location based on the inventory level of each item at each location after the third adjustment and the production, procurement, and transfer supplies.

18. The system of claim 17, wherein the one or more user constraints comprise an inventory level for at least one of the one or more items at one or more locations in the supply chain.

19. The system of claim 17, wherein the one or more user constraints comprise a maximum budget for total inventory.

20. The system of claim 19, wherein calculating the safety stock level for each of the one or more items at each location in the supply chain further comprises calculating a safety stock level for each of the one or more items at each location in the supply chain that has a total inventory cost not greater than the maximum budget for total inventory.

21. The system of claim 17, further comprising calculating an inventory allocation for each of the one or more items at each location in the supply chain based on the total time-phased inventory, the constrained safety stock level for each of the one or more items at each location in the supply chain, and the one or more user constraints wherein the one or more user constraints are selected from a group consisting of budget constraints, service level constraints, and capacity constraints.

22. The system of claim 21, wherein making the first adjustment, second adjustment, third adjustment, and fourth adjustment to the inventory level for each item at each location are each further based on the user constraints.

* * * * *

UNITED STATES PATENT AND TRADEMARK OFFICE
CERTIFICATE OF CORRECTION

| | | |
|---|---|---|
| PATENT NO. | : 8,165,904 B2 | |
| APPLICATION NO. | : 11/248921 | |
| DATED | : April 24, 2012 | |
| INVENTOR(S) | : Srinivasan et al. | |

It is certified that error appears in the above-identified patent and that said Letters Patent is hereby corrected as shown below:

In column 4, line 28, delete "an other" and insert -- another --, therefor.

In column 5, line 39, delete "ore" and insert -- or --, therefor.

In column 8, line 61, delete "user -defined" and insert -- user-defined --, therefor.

In column 10, line 10, delete "can not" and insert -- cannot --, therefor.

In column 11, line 43, delete "$XPALB_{i,g,}$" and insert -- $XPALB_{i,g}$ --, therefor.

In column 11, line 44, delete "$XPAUB_{i,g,}$" and insert -- $XPAUB_{i,g}$ --, therefor.

In column 11, line 45, delete "$UISS_{i,g,}$" and insert -- $UISS_{i,g}$ --, therefor.

In column 11, line 61, delete "$XCOCRV_{,i,g,t,r}$" and insert -- $XCOCRV_{i,g,t,r}$ --, therefor.

In column 14, line 1, delete "safety" and insert -- Safety --, therefor.

In column 14, line 11, delete "chain" and insert -- chain, --, therefor.

In column 14, line 13, delete "node" and insert -- node. --, therefor.

In column 14, line 32, delete "$\mu_{l,g,t,}$" and insert -- $\mu_{I,g,t}$ --, therefor.

In column 16, line 28, delete "$K_i >= SPIDQ_i > 0$" and insert -- $K_i >= SPIDQ_i >= 0$ --, therefor.

In column 16, line 33, delete "into" and insert -- into. --, therefor.

In column 16, line 59, delete "item" and insert -- item. --, therefor.

Signed and Sealed this
Seventh Day of August, 2012

David J. Kappos
*Director of the United States Patent and Trademark Office*

CERTIFICATE OF CORRECTION (continued)
U.S. Pat. No. 8,165,904 B2

In column 17, line 14, delete "user -defined" and insert -- user-defined --, therefor.

In column 17, line 18, delete "requirement" and insert -- requirement: --, therefor.

In column 18, line 12, delete "postponement" and insert -- postponement. --, therefor.